(12) United States Patent
Kaarela et al.

(10) Patent No.: US 8,194,681 B2
(45) Date of Patent: Jun. 5, 2012

(54) BRIDGING BETWEEN AD HOC LOCAL NETWORKS AND INTERNET-BASED PEER-TO-PEER NETWORKS

(75) Inventors: Kari Kaarela, Oulu (FI); Kirmo Koistinen, Oulu (FI); Timo P. Tervo, Oulu (FI)

(73) Assignee: Core Wireless Licensing S. á.r. l., Luxembourg (LU)

( * ) Notice: Subject to any disclaimer, the term of this patent is extended or adjusted under 35 U.S.C. 154(b) by 602 days.

(21) Appl. No.: 11/438,950

(22) Filed: May 23, 2006

(65) Prior Publication Data

US 2007/0274327 A1 Nov. 29, 2007

(51) Int. Cl.
*H04L 12/28* (2006.01)
*H04L 12/56* (2006.01)
*H04W 4/00* (2009.01)
*G06F 15/16* (2006.01)

(52) U.S. Cl. ......... 370/401; 370/338; 709/230; 709/249
(58) Field of Classification Search .................. 370/401, 370/338, 465–467; 709/249, 230, 223; 455/414.1
See application file for complete search history.

(56) References Cited

U.S. PATENT DOCUMENTS

| | | | |
|---|---|---|---|
| 2002/0103850 A1 | 8/2002 | Moyer et al. | |
| 2003/0158839 A1* | 8/2003 | Faybishenko et al. | 707/3 |
| 2003/0217136 A1* | 11/2003 | Cho et al. | 709/223 |
| 2004/0148439 A1* | 7/2004 | Harvey et al. | 709/249 |
| 2004/0208480 A1* | 10/2004 | Yoon et al. | 386/69 |
| 2004/0248594 A1* | 12/2004 | Wren, III | 455/465 |
| 2005/0097087 A1* | 5/2005 | Punaganti Venkata et al. | 707/3 |
| 2005/0114491 A1* | 5/2005 | Bushmitch et al. | 709/223 |
| 2005/0232242 A1* | 10/2005 | Karaoguz et al. | 370/352 |
| 2005/0232283 A1 | 10/2005 | Moyer et al. | |
| 2005/0232284 A1* | 10/2005 | Karaoguz et al. | 370/401 |
| 2005/0233742 A1* | 10/2005 | Karaoguz et al. | 455/432.3 |
| 2006/0036548 A1* | 2/2006 | Roever et al. | 705/51 |

(Continued)

FOREIGN PATENT DOCUMENTS

WO WO 2006/071468 7/2006

(Continued)

OTHER PUBLICATIONS

"The Gnutella Protocol Specification v0.4", Document Revision 1.2, printed from the Internet Jun. 21, 2006.

(Continued)

*Primary Examiner* — Ayaz Sheikh
*Assistant Examiner* — Hoang-Chuong Vu

(57) ABSTRACT

Bridging between ad hoc local networks and Internet based peer-to-peer networks involves coupling a bridge device to a local network using an ad-hoc, peer-to-peer protocol used for exchanging data between consumer electronics devices. The bridge device is coupled to a public network using an Internet-based peer-to-peer networking protocol. In one arrangement, metadata related to media accessible from a media server of the local network is determined via the bridge device, and the metadata is transformed via the bridge device to enable peer-to-peer devices of the public network to discover the media via the bridge device using the Internet-based peer-to-peer networking protocol. In another arrangement, metadata related to media accessible from the public network is determined via the peer-to-peer networking protocol, and the metadata is transformed via the bridge device to enable a device of the local network to discover the media via the bridge device using the ad-hoc, peer-to-peer protocol.

15 Claims, 11 Drawing Sheets

U.S. PATENT DOCUMENTS

| | | | |
|---|---|---|---|
| 2006/0112192 A1* | 5/2006 | Stewart et al. | 709/249 |
| 2006/0133391 A1* | 6/2006 | Kang et al. | 370/401 |
| 2006/0133392 A1* | 6/2006 | Ajitomi et al. | 370/401 |
| 2006/0140199 A1* | 6/2006 | Ma et al. | 370/401 |
| 2006/0153072 A1* | 7/2006 | Bushmitch et al. | 370/230 |
| 2006/0155850 A1* | 7/2006 | Ma et al. | 709/226 |
| 2006/0168225 A1* | 7/2006 | Gunning et al. | 709/226 |
| 2006/0168318 A1* | 7/2006 | Twiss | 709/238 |
| 2006/0168656 A1* | 7/2006 | Stirbu | 726/15 |
| 2006/0218650 A1* | 9/2006 | Costa-Requena et al. | 726/27 |
| 2006/0233180 A1* | 10/2006 | Serghi et al. | 370/401 |
| 2006/0233184 A1* | 10/2006 | Stanforth | 370/401 |
| 2006/0282863 A1* | 12/2006 | Bushmitch et al. | 725/80 |
| 2006/0291434 A1* | 12/2006 | Gu et al. | 370/338 |
| 2007/0004436 A1* | 1/2007 | Stirbu | 455/503 |
| 2007/0203979 A1* | 8/2007 | Walker et al. | 709/204 |
| 2007/0211632 A1* | 9/2007 | Song et al. | 370/230 |
| 2007/0214232 A1* | 9/2007 | Belimpasakis et al. | 709/217 |
| 2008/0183892 A1* | 7/2008 | Holder et al. | 709/240 |
| 2008/0235198 A1* | 9/2008 | Duncan et al. | 707/4 |
| 2009/0182842 A1* | 7/2009 | Dutta et al. | 709/218 |

FOREIGN PATENT DOCUMENTS

WO    WO 2007/039807    4/2007

OTHER PUBLICATIONS

Debique et al., "Content Directory: 1 Service Template Version 1.01", Jun. 25, 2002, pp. 1-89.

* cited by examiner

BRIDGING BETWEEN AD HOC LOCAL NETWORKS AND INTERNET-BASED PEER-TO-PEER NETWORKS

FIELD OF THE INVENTION

This invention relates in general to computing devices, and more particularly to sharing data between local and Internet-based peer-to-peer networks.

BACKGROUND OF THE INVENTION

Universal Plug and Play™ (UPnP) defines an architecture for pervasive, peer-to-peer networking between all types of consumer electronics, including intelligent appliances, wireless devices, and PCs of all form factors. UPnP technologies provide a way for disparate processing devices to exchange data via proximity or ad hoc networks. The UPnP framework is designed to bring easy-to-use, flexible, standards-based connectivity to ad-hoc or unmanaged networks whether in the home, in a small business, public spaces, or attached to the Internet. UPnP technologies provide a distributed, open networking architecture that leverages TCP/IP and the Web technologies to enable seamless proximity networking in addition to control and data transfer among networked devices.

The UPnP Device Architecture (UDA) is designed to support zero-configuration, "invisible" networking, and automatic discovery for a breadth of device categories from a wide range of vendors. This means a device can dynamically join a network, obtain an IP address, convey its capabilities, and learn about the presence and capabilities of other devices. The UPnP specification includes standards for service discovery. Various contributors publish UPnP device and service descriptions, thus creating a way to easily connect devices and simplifying the implementation of networks. It is the goal of UPnP to enable home electronics to seamlessly interact, thus furthering the usefulness of such devices.

Besides allowing locally connected to devices to intercommunicate, the UPnP standard provides a way for the locally devices to easily access external networks such as the Internet. In many scenarios, it is envisioned that a UPnP Internet Gateway Device (IGD) will reside on the edge of the UPnP network and provide connectivity to a Wide Area Network (WAN), including the Internet. An IGD may be implemented as a standalone device or included in another UPnP device (e.g., a personal computer). Besides allowing local UPnP devices to access the Internet, the IGD may also be configured to allow the user to access devices on the UPnP network via the Internet when the user is away from the local network.

Accessing a home or other local network from an external network is often referred to as remote access. There are currently some technological approaches envisioned to provide remote access to the digital home. Typically, these technologies rely on the IGD or similar fixed device to act as an entry point into the local network. For example, the IGD may be configured to accept connections using Virtual Private Networking (VPN) technologies. VPN uses an encrypted "tunnel" through an untrusted network to securely connect endpoints. A VPN can provide a full range of network connectivity to external devices, and potentially extend the UPnP network to externally networked devices.

However, a VPN connection requires a significant amount of overhead, not only in processing connections, but in setup and maintenance of the VPN. Because a VPN can potentially open the entire local network up to intruders, a number of security precautions must be enforced when implementing a VPN solution. Some types of remote access applications, however, are more limited in scope and therefore a VPN solution is an overly complicated and inconvenient option. Similarly, such remote access may be provided by a UPnP IGD. However, a device such as an IGD is primarily designed for basic routing and firewalling operations, whereas typical P2P applications use functions that are particular to the relevant P2P protocols. Therefore, it may not always be appropriate to control remote access via an IGD for purposes of participating in specialized remote access applications.

One example of a specialized remote access protocol is Internet peer-to-peer (P2P) networking. P2P technologies allow network peers to connect to each other when each party in the P2P network has the same capability. Any of the peers may initiate the communication session with any other of the parties in the network, and the peers may provide different services to each other depending of the P2P implementation. Example P2P protocols include Gnutella, Napster, and Session Initiation Protocol (SIP). The first two protocols are commonly associated with file sharing, and SIP is commonly used for establishing media sessions, including images, voice, sound, etc.

Although a fixed device such as an IGD using VPN may provide access to a home network by elements of an Internet P2P network, the level of access provided by a VPN would be far too great for untrustworthy Internet peers. Further, Internet and other infrastructure-based P2P applications utilize protocols that may be incompatible with UPnP. Therefore, a solution that connects P2P and UPnP networks in a limited fashion is desirable.

SUMMARY OF THE INVENTION

To overcome limitations in the prior art described above, and to overcome other limitations that will become apparent upon reading and understanding the present specification, the present invention discloses a system, apparatus and method for bridging between ad hoc local networks and Internet based peer-to-peer networks. In one embodiment, a method involves coupling a bridge device to a local network using an ad-hoc, peer-to-peer protocol used for exchanging data between consumer electronics devices. The bridge device is coupled to a public network using an Internet-based peer-to-peer networking protocol. The bridge device determines metadata related to media accessible from a media server of the local network. The metadata is transformed via the bridge device to enable peer-to-peer devices of the public network to discover the media via the bridge device using the Internet-based peer-to-peer networking protocol.

In more particular embodiments, the method further involves facilitating downloading of the media as a file to the peer-to-peer devices of the public network via the bridge device and/or streaming the media to the peer-to-peer devices of the public network via the bridge device. Streaming the media to the peer-to-peer devices of the public network via the bridge device may involve establishing a Session Initiation Protocol session between the bridge device and at least one of the peer to peer devices of the public network. In one arrangement, coupling the bridge device to the local network using the ad-hoc, peer-to-peer protocol involves coupling the bridge device to the local network using Universal Plug and Play, where the bridge device may further act as a Universal Plug and Play control point. Coupling the bridge device to the public network using the Internet-based peer-to-peer networking protocol may also involve coupling the bridge device to a Gnutella network and/or a SIP-based communications network.

In another more particular embodiment, the method further involves determining via the bridge device metadata related to media accessible from the public network via the peer-to-peer networking protocol. The metadata is transformed via the bridge device to enable the peer-to-peer devices of the local network to discover the media via the bridge device using the ad-hoc, peer-to-peer protocol.

In another embodiment of the invention, a method involves coupling a bridge device to a home network using an ad-hoc, peer-to-peer protocol used for exchanging data between consumer electronics devices. The bridge device is coupled to a public network using an Internet-based peer-to-peer networking protocol. The bridge device determines metadata related to media accessible from the public network via the peer-to-peer networking protocol, and transforms the metadata to enable a device of the local network to discover the media via the bridge device using the ad-hoc, peer-to-peer protocol.

In another embodiment of the invention, an apparatus includes one or more network interfaces capable of communicating via a local network and a public network, and a processor coupled to the one or more network interfaces. A memory is coupled to the processor, and includes instructions that cause the processor to connect to the local network using an ad-hoc, peer-to-peer protocol used for exchanging data between consumer electronics devices. The instructions cause the processor to connect to the public network using an Internet-based peer-to-peer networking protocol, determine metadata related to media accessible from a media server of the local network, and transform the metadata to enable peer-to-peer devices of the public network to discover the media via the apparatus using the Internet-based peer-to-peer networking protocol.

In more particular embodiments, the instructions further cause the processor to facilitate downloading the media as a file from the local network to the peer-to-peer devices of the public network via the one or more network interfaces and/or to facilitate streaming of the media to the peer-to-peer devices of the public network via the one or more network interfaces. The instructions may cause the processor to connect to the local network using Universal Plug and Play, and in one configuration to act as a Universal Plug and Play control point. The Internet-based peer-to-peer networking protocol may include at least one of a Gnutella-based protocol and a SIP-based communications protocol. The instructions may further cause the processor to determine metadata related to media accessible from the public network via the peer-to-peer networking protocol, and transform the metadata to enable the peer-to-peer devices of the local network to discover the media using the ad-hoc, peer-to-peer protocol.

In another embodiment of the invention, an apparatus includes one or more network interfaces capable of communicating via a local network and a public network, and a processor coupled to the one or more network interfaces. A memory is coupled to the processor, and includes instructions that cause the processor to connect to the local network using an ad-hoc, peer-to-peer protocol used for exchanging data between consumer electronics devices. The instructions cause the processor to connect to the public network using an Internet-based peer-to-peer networking protocol, determine metadata related to media accessible from the public network via the peer-to-peer networking protocol, and transform the metadata via bridge device to enable a device of the local network to discover the media via the bridge device using the ad-hoc, peer-to-peer protocol.

In another embodiment of the invention, a computer-readable medium has instructions stored which are executable by a bridge device capable of being coupled to a first network and a second network. The instruction causing the bridge device to perform steps that include connecting to the first and second networks. One of the first and second network includes a local network utilizing an ad-hoc, peer-to-peer protocol, and the other of the first and second networks includes a public network having peer-to-peer devices coupled via an Internet-based peer-to-peer networking protocol. The instruction causing the bridge device to determine metadata related to media accessible from devices of the first network, and transform the metadata to enable devices of the second network to discover the media via the bridge device.

In another embodiment of the invention, a system includes a first network and a second network. One of the first and second networks includes a local network utilizing an ad-hoc, peer-to-peer protocol, and the other of the first and second networks includes a public network having peer-to-peer devices coupled via an Internet-based peer-to-peer networking protocol. A bridging device is coupled to the first network and the second network. The bridging device includes: means for discovering media accessible from devices of the first network; means for determining metadata related to the media; and means for transforming the data between formats conforming to the protocols of the first network to formats conforming to the protocols of the second network to enable devices of the second network to discover the media via the bridging device.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention relates to using a locally coupled device act as a bridge to external peer-to-peer (P2P) networks. In one arrangement, the local network includes Universal Plug and Play (UPnP) compatible devices and services that are made accessible to an Internet P2P network via a locally coupled bridging device. In other configurations, the UPnP/P2P bridge makes UPnP services of the local network available to the P2P network. For example, the bridging device may offer media from one or UPnP media servers to peers of the P2P network. In order to provide this functionality, the bridging device will translate metadata between the UPnP network, and may also modify mechanisms used to access the underlying media.

Figure 1:
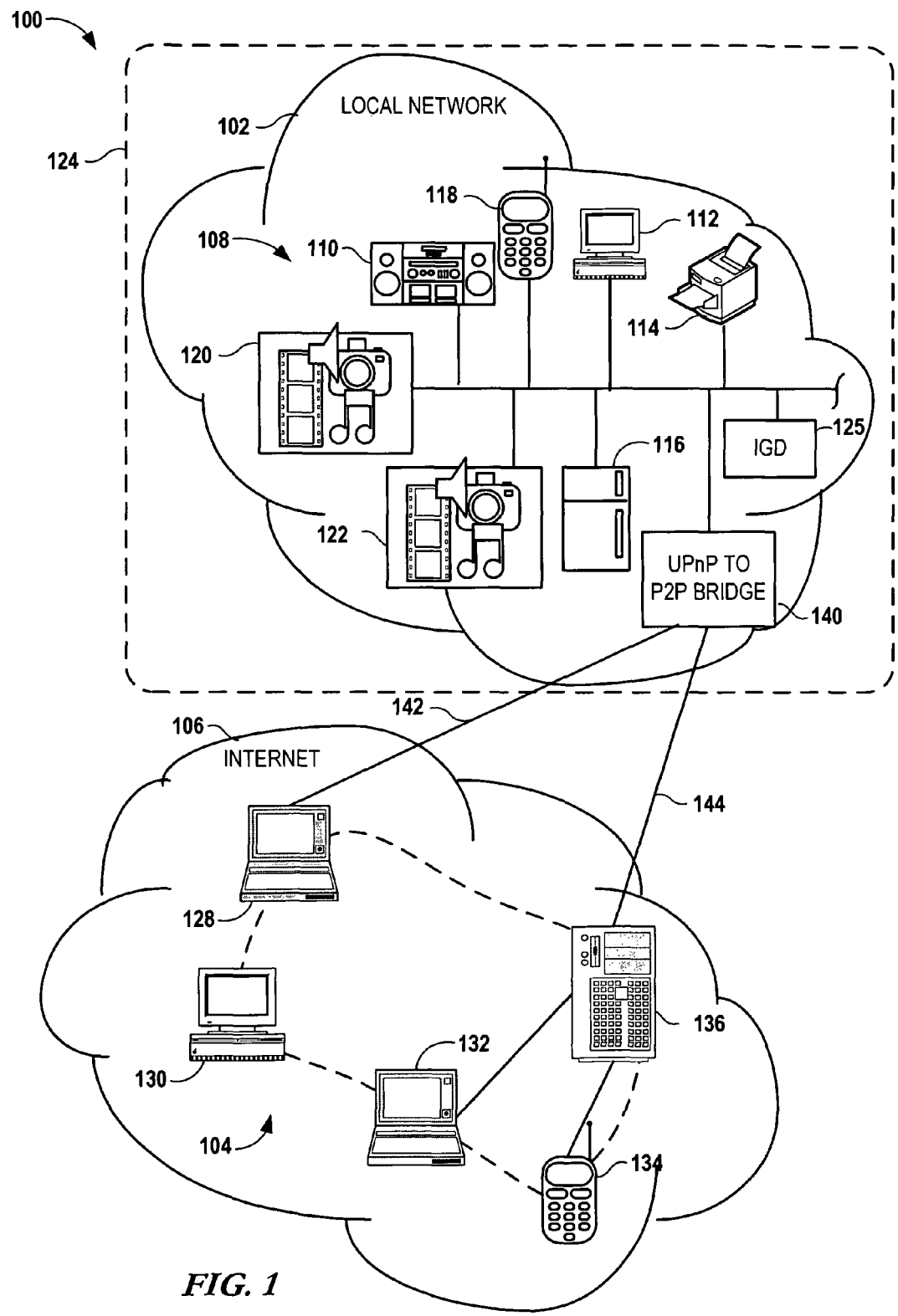
FIG. 1 is a block diagram illustrating a system according to embodiments of the invention.

In reference now to FIG. 1, a block diagram 100 illustrates a system for coupling a local network 102 with a P2P network 104 on the Internet 106 (or other external network) according to embodiments of the invention. The local network 102 may include any combination of data transmission media and protocols. For example, the network may utilize wired or wireless data transmission media. Similarly, devices on the local network 102 may use various physical and data link layer protocols to intercommunicate, including, Ethernet, FDDI, PPP, ATM, HDLC, Fibre Channel, X-10, serial/parallel point-to-point connections, etc. A number of higher layer network protocols may operate on the network 102 as well, including TCP/IP, UDP/IP, IPX, Appletalk, ICMP, ARP, SNMP, DNS, FTP, NetBEUI.

Generally, the local network 102 may support one or more protocols for ad-hoc, peer-to-peer service discovery and interoperability. One example of this type of protocol is the UPnP architecture. UPnP uses the Simple Service Discovery Protocol (SSDP) for service discovery, and is generally built on top of Internet Protocol (IP) based networks. Although concepts of the present invention may be described in terms of UPnP networks, those familiar with the applicable art will appreciate that these concepts may be applied to any manner of ad-hoc, peer-to-peer networking arrangement suitable for consumer oriented networks. For example, the present invention may also be any combination of home networking and control technologies such as Jini, Bluetooth, X-10, xAP, Rendezvous, HomeRF, IrDA, etc.

Many consumer devices 108 include data processing capabilities, and therefore can benefit from being locally networked. In the illustrated diagram 100, the local network devices 108, fixed or portable, include an entertainment system 110 (such as digital TV, set-top box, digital video recorder, display, LCD projector), audio/video player/recorder, digital still/video camera, computer 112, printer 114, smart appliance 116, mobile communications device 118 (e.g., cellular phone or PDA), and may include any other home or industrial or in-vehicle automation system including sensors and control devices. These devices 108 are merely exemplary; any manner of electronic or electromechanical device may be made network-aware and interoperate via the local network 102. Protocols such as UPnP are designed to be generic and flexible so that any type of control or data processing functionality can be abstracted and offered as a service to any other UPnP capable entity on the network 102.

Also included in the local network 102 are media servers 120, 122. These servers 120, 122 are logical entities defined in the UPnP Audio Video (AV). The UPnP AV specification is an adaptation of UPnP that allows consumer electronics devices to distribute digital entertainment content throughout a home/office network. UPnP AV deals with three specific logical entities, media servers 120, media renderers (e.g., entertainment system 110, computer 112), and control points (e.g., computer 112, mobile device 118). Alternatively, any device 110, 112, 114, 116, 118, 125 may function as a media server, a media renderer or a control point, even at the same time, and several devices may assume the same roles at the same time. The media servers 120, 122 may include dedicated hardware (e.g., standalone, network-attached storage) or may be incorporated into other devices such as the computer 112 and/or entertainment system 110. In the latter arrangement, the devices containing the media server 120, 122 may also include other UPnP AV logical components. For example, the computer 112 may include a sound card and speakers that serve as a UPnP media renderer, and a graphical user interface (GUI) and input devices that serve as a UPnP control point. Although a computer 112 may already have this capability (e.g., MP3 jukebox software), by presenting the functions as UPnP AV logical components, any other UPnP device on the network 102 may be able to seamlessly interface with these functions. For example, the mobile device 118 may be automatically configured as a control point, and be able to control playback of music on the computer 112 from anywhere in the local environment.

The local network 102 is typically designed to service a limited physical region, as indicated by the physical region 124. This region 124 may include any space where a user would like devices to easily interoperate, including a home, office, hotel room, automobile, airplane, boat, public wireless hotspot, etc. The protocols used in the local network 102 (e.g., UPnP) often assume that the network 102 will need to support only a limited number of devices operating within a reasonably small area. However, many devices on the local network 102 may benefit from information services available via the external network 106, particularly the Internet.

Generally, devices 108 of the local network 102 may access the Internet 106 via a special UPnP function known as an Internet Gateway Device (IGD) 125. An IGD provides routing and firewall services on behalf of the devices 108, similar to the functions of a conventional gateway. The IGD 125 has a narrowly defined function—to act as a gateway. As such the IGD 125 only deals with the low level protocols needed to deliver data to endpoints, and (with some exceptions) is unconcerned about the format or application level protocols used by devices on the network 102.

However, many network applications use common application protocols that may be used by a wide variety of different devices and software. One example is a P2P network. Generally, P2P protocols involve end-user devices communicating directly with one another without requiring an intermediary device, such as a server. For example, Internet email is designed to send messages between end-users, but typically does not operate in a P2P fashion. Email applications require a number of known network servers in order to operate. For example, and email application may require the Internet Protocol (IP) address of a Post Office Protocol (POP) or Internet Message Access Protocol (IMAP) server for retrieving incoming email, in addition to an IP address of a Simple Mail Transport Protocol (SMTP) server for outgoing messages. The messages are passed between these and other network servers before being delivered to end-users.

In contrast, a P2P network involves individual user devices, or nodes, discovering and initiating direct connections with each other. The nodes directly negotiate the transactions, and may act independently or cooperatively to perform certain tasks. The diagram 100 of FIG. 1 shows an example Internet-based P2P network 104. The P2P network 104 may include devices, fixed or portable, such as computers 128, 130, an entertainment system (such as digital TV, set-top box, digital video recorder, display, LCD projector), audio/video player/recorder, digital still/video camera, computer, printer, smart appliance, mobile communications device 134 (e.g., cellular phone or PDA), home or industrial or in-vehicle automation system including sensors and control devices that directly communicate with other peer nodes. Other devices, such as computer 132 and mobile device 134, may utilize a proxy 136 that may process some or all of the P2P tasks on behalf of the devices 132, 134. Alternatively, all devices on the P2P network may utilize a proxy 136 that may process some or all of the P2P tasks on behalf of the devices.

The P2P network 104 may perform many different functions. One example is P2P file sharing, popularized by such applications/protocols as Napster and Gnutella. The original Napster protocol used a centralized server to store descriptions of files that were available for sharing on end-users computers. Other users could find objects of interest on that centralized server, and thereafter connect to a computer that currently stored that object of interest. In contrast, the Gnutella protocol removes need for a centralized search server, and allows peers themselves to process and forward search requests. Even though Gnutella operates with minimal fixed infrastructure (e.g., servers), Gnutella peers may still need to connect to a well-known server in order to find IP addresses of peers with which to initially connect.

Another example of a peer-to-peer protocol is the Session Initiation Protocol (SIP). SIP is used in providing services such as Voice Over Internet Protocol (VoIP), Push To Talk (PTT) on mobile networks, etc. SIP is a standard for initiating, modifying, and terminating interactive user sessions. Typically, SIP sessions involves multimedia elements such as video, voice, instant messaging, push-to-talk voice communications, whiteboarding, online games, virtual reality, etc. SIP peers may require the services of a location server or similar database in order to locate an end-user device, the actual negotiation of a SIP session may occur between the peers themselves.

The SIP framework was to provide functions analogous to those call processing functions and features present in the public switched telephone network (PSTN). As such, SIP provides features similar to those familiar to telephone users, such as dialing numbers and handling of various status tones (e.g. ringing, busy, dial-tone, etc.). SIP may also allow communications devices to use more advanced call processing features such as call-waiting, call-forwarding, caller identification, etc.

SIP works in concert with several other protocols and is only involved in the signaling portion of a communication session. SIP is generally used for setting up and tearing down voice or video calls. The media of SIP-established calls are often communicated over different protocols, such as the Real time Transport Protocol (RTP). SIP is also often used with the Session Description Protocol (SDP), which is used to describe and negotiate the media content of the session. For example, SDP can be used to describe codecs, data rates, TCP/UDP ports, and other data descriptive of the media session.

Applications that use SIP and related protocols via the Internet 106 may be able to take advantage of devices on the UPnP network as well. For example, it may be desirable to use SIP session to establish a streaming media playback session using from a media server 120, 122 to an Internet coupled device, such as mobile device 134. However, the UPnP network 102 will not typically be openly coupled to the Internet 106 to allow such an interaction to take place. Even if such a connection between Internet device 134 and media servers 120, 122 were available, the UPnP media servers 120, 122 would not likely be adapted to establish a session using SIP.

Therefore, in one embodiment of the invention, a UPnP to P2P bridge device 140 is provided to allow an Internet-coupled, P2P network 104 to take advantages of services of the local, UPnP network 102. The bridge device 140 is able to connect directly to peers of the P2P network, as indicated by paths 142, 144. These connections 142, 144 may be provided by a direct connection between the bridge device 140 and the Internet 106, or some intermediary public network, such as a wireless provider network. Additionally, the bridge device 140 may establish P2P connections 142, 144 via an element the UPnP network 102, such as via the UPnP IGD 125.

One of the advantages of using the bridge device 140 is that the device 140 can be custom tailored to the respective protocols of the local network 102 and the P2P network 104. One example of this is shown in the block diagram 200 of FIG. 2, which shows a bridging scenario according to embodiments of the invention. A bridge device 202 is coupled both to a UPnP local network 204 and an Internet P2P network 206. The P2P network 206 may utilize a file-sharing protocol such as Gnutella, Napster, BitTorrent, FreeNet, etc. The arrangement 200 may also be applicable to other types of P2P protocols, including a distributed computing model such as Berkeley Open Infrastructure for Network Computing (BOINC), Alchemi, etc. In the illustrated example, a peer device 208 of the P2P network 206 desires to access a file from the local network 204 using the P2P protocol. To enable this access, a bridge device 210 is coupled to both the P2P network 206 and the local network 204.

Generally, P2P networks 206 provide a mechanism for both querying to find data (e.g., based on filenames) and for transferring the data that is found. For example, the Gnutella protocol utilizes specially crafted query messages that are passed to a select number of peers. Each of the peers checks the query (usually a character string) against any files stored by the peer. If the query results in a hit, the result is sent back to the requesting node. If a download is desired based on the query results, then a separate media access mechanism is invoked, such as downloading a file or streaming of media. These two aspects of P2P communications are referred to herein as "control" and "media session" aspects of P2P networking.

The bridge 210 may be configured to respond to and provide files to any peer of the P2P network 206. However, the owner of the local network 204 may want to limit access to the network 204, such that access is limited to certain devices, accounts, or other access restrictions. For example, the device 208 may be a mobile device of the owner of the local network 204, and the bridge may honor requests only from an identifier associated with the mobile device 208, such as a media access control (MAC) address, hostname, IP address, etc. Alternatively, the bridge 210 and peer device 208 may use pre-arranged hash or encryption of query strings, such that standard, clear text queries directed to the bridge 210 will present zero results. If an encrypted query is sent from the peer device 208 to the bridge 210, however, the bridge may potentially return some results, by either de-encrypting the query string and comparing against unencrypted local metadata or comparing the encrypted search string against encrypted metadata.

The bridge 210 typically need not include any files of its own for sharing. The bridge 210 should, however, be able to determine files that are available via entities of the UPnP network 204. For example, a media server 212 may include a persistent data store 214 for holding music, video, images, and the like. The media server 212 may include a UPnP Content Directory Service (CDS) 216 that allows media servers 212 and similar devices to expose available content in an XML tree data structure. The content discoverable via the CDS 216 may include individual pieces of content such as songs and video clips. The CDS content may also include containers, which represent collections of items such as playlists and photo albums. Each CDS content object, whether an item or container, includes metadata that describes various attributes of the object, such as title, artist, etc.

The CDS 216 allows a UPnP devices, such as a UPnP Control Point, to browse the content on the media server 212 and obtain detailed information about individual content objects. The CDS 216 provides lookup functions such as "browse" and "search" that allows devices to discover individual data objects stored on the media server 212. The CDS 216 also provides functions that allow inserting/creating new objects in the media server 212. Once data objects have been located in the CDS 216, metadata included in the objects can be used for locating the content via a UPnP Media Renderer device. For example, the metadata may include a Universal Resource Identifier (URI) that points to a file located on the media server 216. By using a standard content lookup method (i.e. the CDS 216), the processes of storing, retrieving, changing, and rendering digital content can be handled by many UPnP devices. The standards-based nature of UPnP allows these devices to successfully communicate such actions, even though the devices may be from different vendors and use different operating systems.

In the illustrated example, the bridge 210 includes a UPnP Control Point interface 218 and a UPnP Media Renderer interface 220 that emulates respective Control Point and Media Renderer devices on the network 204. These interfaces 218, 220 allow the bridge 210 to search for and deliver content on the UPnP network 204 (e.g., acting as a UPnP Control Point) for the benefit of the device 208 on the P2P network 206. For example, assume the user of device 208 wishes to query for a sound recording of Mozart. The user forms query 222 using a search string (e.g., "Mozart"). This query 222 is submitted via the P2P network 206, where it is received by a P2P interface 224 of the bridge 210. Although the query 222 is shown going directly from the peer device 208 to the bridge 210, it will be appreciated that queries 222 (and associated responses) are often routed between intermediate elements of the P2P network 206 for purposes of efficiency and scalability.

The P2P interface 224 handles the incoming query by at least examining the content and deciding whether to process further based on some predetermined criteria. Assuming that the query 222 is one that the bridge 210 intends to process further, the query is transformed, as indicated by path 226. The transformation 226 may involve extracting relevant data, making an internal record of the query data for later processing, and applying changes to specific query data. These changes may involve encryption/decryption, stripping out control characters, changing character formats (e.g., ASCII, Unicode), rearranging order of data, and adding data specific to the UPnP network 204. In this example, the transformed data is passed 226 to the control point interface 218, where it becomes a CDS query 228. A CDS query 228 in this example might look like the example of Listing 1 below.

Listing 1

Search( "0", "dc:title contains "Mozart"", "*",
  0, 100, "+dc:title" )

The CDS 216 processes the query 228, which may involve querying the data store 214, as indicated by path 230 and providing a result 232. In the UPnP AV standard, search results 232 from a CDS 216 are in an XML formatted document. An example result 232 is shown below in Listing 2, wherein two results containing the search term "Mozart" are returned. Note that the "res" elements in Listing also provide the bridge 210 a way to access the file for purposes of downloading.

Listing 2

Search(
"<DIDL-Lite xmlns:dc="http://purl.org/dc/elements/1.1/"
xmlns:upnp="urn:schemas-upnp-org:metadata-1-0/upnp/"
    xmlns="urn:schemas-upnp-org:metadata-1-0/DIDL-Lite/">
<item id="9" parentID="4" restricted="false">
    <dc:title>Mozart Symphony No. 31</dc:title>
    <dc:creator>London Philharmonic</dc:creator>
    <upnp:class>object.item.audioItem.musicTrack
    </upnp:class>
    <res protocolInfo="http-get:*:audio/x-ms-wma:*"
    size="120000">
        http://10.0.0.1/getcontent.asp?id=9
    </res>
</item>
    <item id="11" parentID="4" restricted="false">
    <dc:title>Mozart Symphony No. 40 in G</dc:title>
    <dc:creator>Washington Symphony Orchestra</dc:creator>
    <upnp:class>object.item.audioItem.musicTrack</upnp:class>
    <res protocolInfo="http-get:*:audio/mpeg:*"
    size="70000">
        http://10.0.0.1/getcontent.asp?id=11
    </res>
</item>
</DIDL-Lite>", 2, 2, 1 )

The bridge 210 receives the CDS result 232 and transforms 234 the result in a form usable on the peer-to-peer network, which is then sent out via the P2P interface 224 of the bridge. For example, in Gnutella, this may involve forming a QueryHit message 236 that is returned to the requesting peer 208. The QueryHit message 236 includes a listing of files that satisfy the initial query 222, as well as data (e.g., IP address, port) relating to the bridge 210 that allows the requesting node 208 to download any results shown in the QueryHit 236. When transforming 234 the CDS result 232 to a QueryHit 236, the bridge 210 may form a temporary filename for any hits for purposes of presenting results to recipients on the P2P network 206. For example, the download URI in Listing 2 only provides initiates an Active Server Pages (ASP) call in order to retrieve the underlying file, but the actual filename is not provided. Therefore, the bridge 210 may create a temporary filename (e.g., using the title) for each CDS entry, and cache the UPnP access data (e.g., URI, protocol info) related with each temporary filename sent out in the QueryHit message 236.

It may be assumed that the user of the requesting peer 208 will eventually want to download a file offered by the bridge 210 via the P2P network 206. Note that in Gnutella (and other P2P protocols), the actual download of files occurs out-of-band, meaning that the download occurs directly between the downloader 208 and the uploader 210 (both are referred to as "servent" in P2P terminology). A download request 238 is sent from peer 208 to bridge 210. In the Gnutella protocol, this request is in the form of an HTTP GET. For example, a request 238 according to the present example might look like the request in Listing 3.

---
Listing 3
---
GET /get/0009/Mozart-Symphony-No-31.mp3/ HTTP/1.0
Connection: Keep-Alive
Range: bytes=0-
User-Agent: Gnutella
---

If the bridge 210 is firewalled so that it cannot receive the incoming request 238, the Gnutella protocol allows the bridge 210 to request the content be "pushed" to the requested content to the peer 208 by way of a "Push" message. If a Push is successful, the firewalled peer 210 can establish a connection with the other peer 208, which then proceeds to perform a specialized HTTP GET transaction. Upon receipt of the HTTP GET, the bridge 210 determines which entry of the CDS 216 that the request 238 corresponds to, and a UPnP request is formed 240 and sent 242 to the appropriate media server 212. The media server 212 may respond by uploading 244 the data to the media renderer 220 interface of bridge 210. The bridge 210 connects 246 this incoming data 244 as outgoing content 248 sent to the requestor 208. The connection 246 may involve simply buffering the data, although other data conversions may occur (e.g., stripping/converting certain characters) depending on the local and P2P environments.

Figure 2:
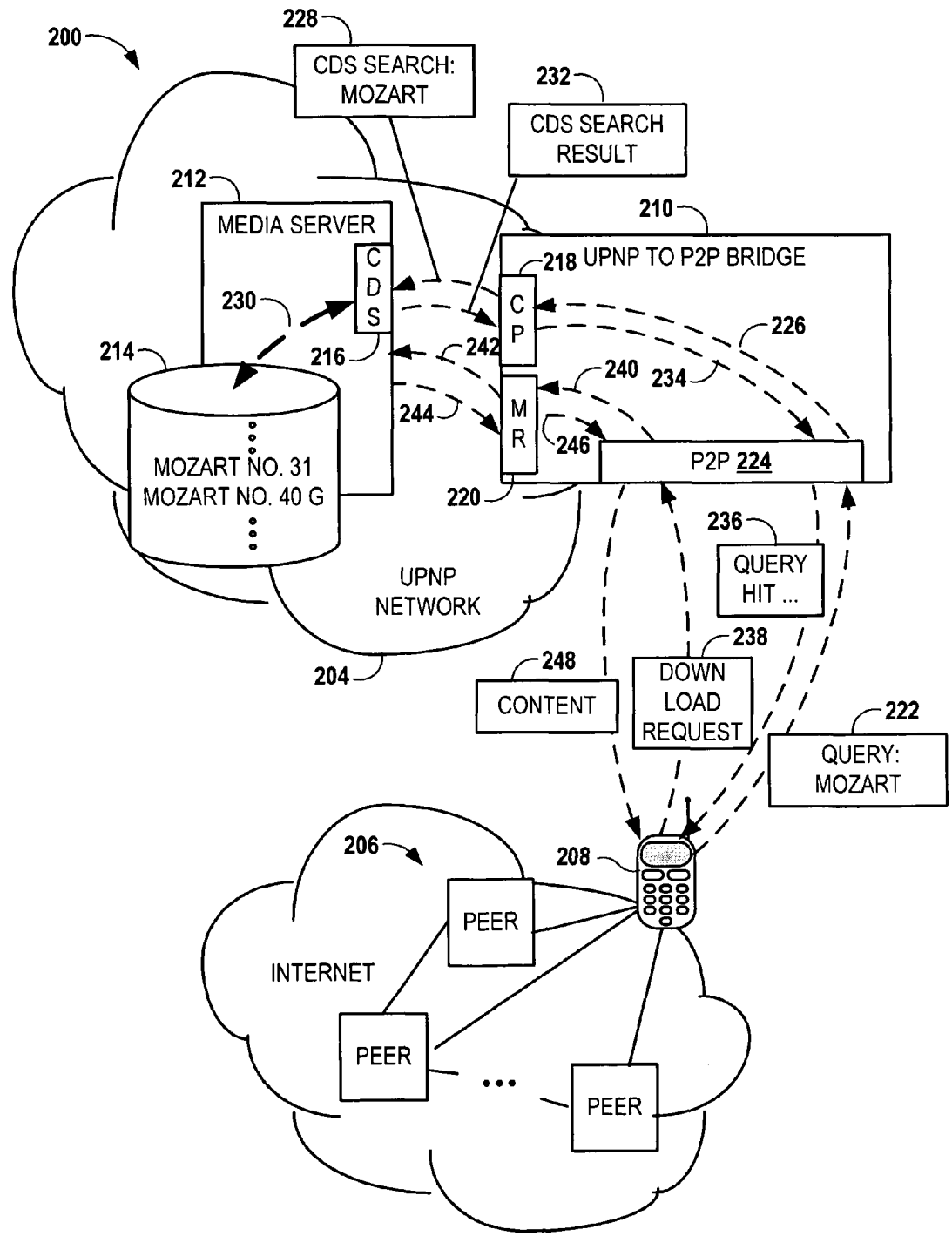
FIG. 2 is a block diagram illustrating sharing of UPnP files with Internet P2P devices according to embodiments of the invention.

It will be appreciated that the transactions in FIG. 2 are provided by way of example, and many variations may occur. For example, the bridge 210 may include its own CDS database (not shown), that caches and/or aggregates listings from multiple media servers 212 of the UPnP network 204. Therefore, the CDS Search queries 228, 232 may be performed within the bridge itself. An example of such an aggregated CDS listing is described in commonly-owned U.S. patent application entitled AGGREGATED CONTENT LISTING FOR AD-HOC PEER TO PEER NETWORKS by Costa-Requena, et al, filed on 21 Dec. 2004 having Ser. No. 11/019,934, which is hereby incorporated by reference in its entirety.

Figure 3:
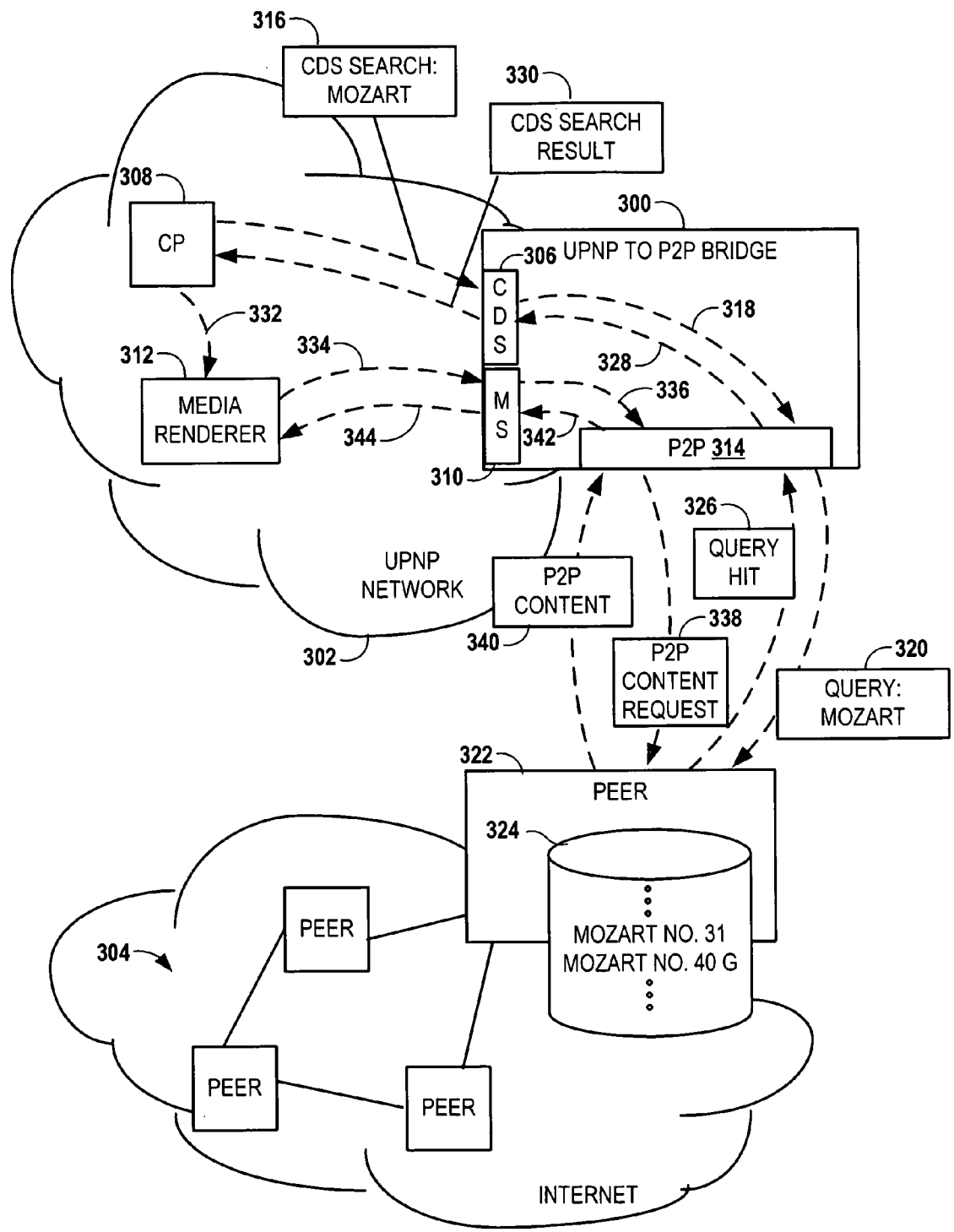
FIG. 3 is a block diagram illustrating sharing of Internet P2P files UPnP content with UPnP devices according to embodiments of the invention.

In the example of FIG. 2, an element 208 of the P2P network 206 accesses media from a media server 212 of a UPnP network 204 by way of a bridge 210. Similarly, as shown in FIG. 3, a bridging device 300 according to an embodiment of the invention can provide media from a P2P network 302 for the benefit of a local UPnP network 304. In this example, the bridge 300 includes a CDS interface 306 that may be accessed by elements of the UPnP network 302, in particular a UPnP Control Point 308. The Control Point 308 can perform searches at the CDS interface 306, and the bridge 300 can use those searches to form queries on the UPnP network 304. The bridge 300 also includes a media server interface 310 that is used to deliver the content to the UPnP network 304, such as the media renderer 312. Finally, the bridge 300 includes a P2P interface 314 that interacts according to the protocols of the P2P network 304

An example of a transaction with the illustrated system involves the Control Point 308 executing a CDS search request 316 with the CDS interface 306 of the bridge 300. This search request 316 is transformed 318 within the bridge to form a query 320 of the P2P network 304. At least one peer 322 of the network receives the query 320, either directly, or (more commonly) indirectly via multiple hops through nodes of the P2P network 304. The peer 322 determines that the query 320 can be satisfied by one or more files in the peer's data store 324, and a QueryHit 326 is sent back to the bridge 300.

Those familiar with P2P protocols will appreciate that the bridge 300 can (and quite often will) receive a plurality of QueryHits 326 from the P2P network 304. The returns from a P2P query are generally dynamic and unpredictable, whereas the a query to a CDS is expected to be more static and reliable. Therefore the bridge 300 may use some predetermined criteria for processing 328 these hits 326. For example, the bridge 300 might wait a predetermined amount of time for the query to finish processing, aggregate duplicate entries, delete entries from slow nodes, more highly rank entries that are present on multiple servents, etc. Even so, the bridge 300 may provide special processing 328 to the hit data 326 so that a search result 330 provided to the Control Point 308 indicates that there may be delays or network failures in accessing media seen in the result 330. For example, the title of individual items in the search result 330 may be prefaced with "P2P-" or similar indicator of source.

The CDS search result 330 will also contain an "res" element describing how the requested content can be accessed. The "res" element may include a URI corresponding to the media server interface 310 of the bridge 300. If the user indicates via the Control Point 308 to play a resultant file from the search result 330, the Control Point 308 may direct 332 the Media Renderer 312 to initiate 334 a download or streaming of the file. The bridge 300 receives this request 334 at the media server interface 310, and translates 336 the request to form a download request 338 via the P2P network 304. Assuming the bridge 300 can establish a connection with the originating servent 322, the content is downloaded 340 by the P2P interface 314 of the bridge 300. The P2P interface 314 connects 342 this data to the media server interface 310, where it is finally sent 344 to the media renderer 312.

The media renderer 312 may be able to buffer and store the entire content file directory, in which case the transfer 344 may involve a file transfer (e.g., HTTP GET or FTP GET). Alternatively, the media renderer 312 may only support a streaming format. In this latter case, the bridge 300 may include memory, either volatile or non-volatile, that buffers and/or stores the media file data, and streams 344 the data to media renderer 312 when at least enough of the content is buffered on the bridge 300 such that the streaming 344 can continue uninterrupted. The bridge 300 may thereafter discard such downloaded data, or cache/store it for later access.

In the examples of FIGS. 2 and 3, the P2P networks 206, 304 were generally described as file sharing networks. However, the concepts described in relation to file sharing may be equally applicable to distributed computing applications that involve the transfer of data between peers. For example, a distributed, P2P computing arrangement may transfer blocks of data via the bridge 210, 300 to elements of the UPnP network 204, 302, where the data is appropriately processed by processing elements of the network 204, 302. Thereafter, the processed data may be passed back out to the P2P networks 206, 304 via the bridge 210, 300 to fulfill the end purposes of the distributed application.

File transfer is only one way that computing elements exchange data. Other paradigms of data transfer include streaming. Streaming generally involves sending a serial stream of data for immediate processing by end points. Although file transfers are also accomplished using streams of data, these streams are assembled into a contiguous block of data and stored once the entire file has been received via the stream. In contrast, a true streaming application usually processes data on the fly and thereafter discarded. Further, the data stream may be joined at an arbitrary point in time, as there is not necessarily a logical beginning or end to a stream as there is with a file download.

The processing of a stream typically involves transforming the data into perceptible signals, including sound and video. Media such as sound and video are robust in the sense that occasional dropped, out of order, or corrupted pieces of data don't significantly degrade the final signal. However, such media is sensitive to latency or long gaps occurring in the stream. Therefore media such as sound and video can be transported using efficient, although unreliable protocols, such as UDP/IP. In particular, a whole set of protocols such as multicast, the Real time Transport Protocol (RTP), Real Time Streaming Protocol (RTSP), Active Streaming Format (ASF), etc., have been developed specifically for the peculiar requirements of streaming media.

Figure 4:
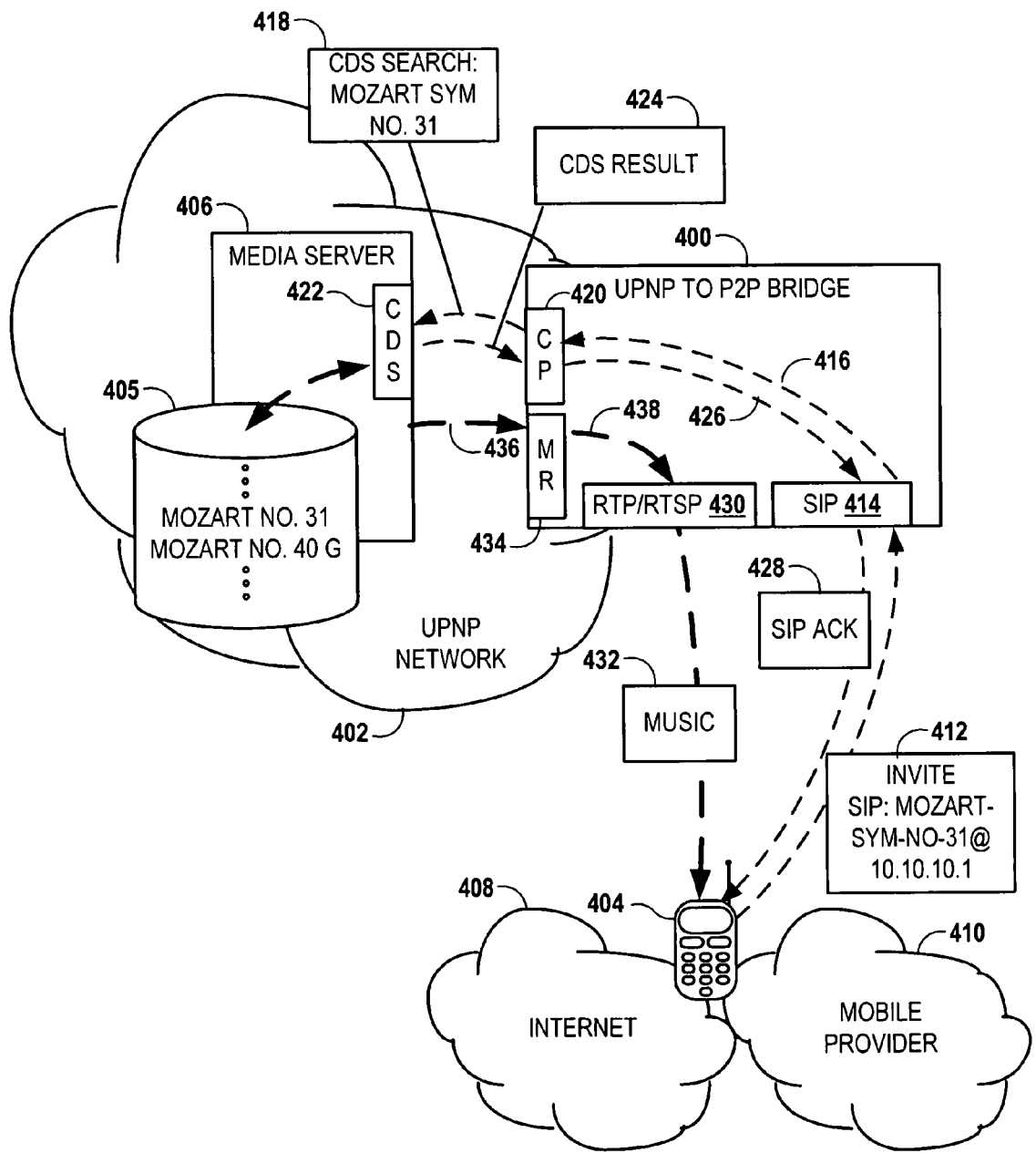
FIG. 4 is a block diagram illustrating streaming UPnP content with Internet P2P devices according to embodiments of the invention.

In reference now to FIG. 4, a UPnP to P2P bridge 400 is shown that couples a UPnP network 402 to a P2P device 404 for streaming data according to an embodiment of the invention. Similar to the examples shown in FIGS. 2 and 3, the streaming data processed by the bridge 400 in FIG. 4 is streaming music originating from a UPnP Media Server 406. In this case, the P2P device 404 is a SIP enabled mobile apparatus that is operable by one or both of the Internet 408 and a mobile services provider network 410 (e.g., a wireless data network). The mobile device 404 is capable of setting up sessions using SIP and other protocols (e.g., SDP), and receiving the streaming data via an appropriate streaming protocol.

In this example, the mobile device 404 may have a listing of songs that are available on the home media server 406. Entries of the song list can be used to form a URI used for accessing each song via the bridge 400. In one example, the mobile device 404 sends a SIP INVITE 412 to a SIP interface 414 of the bridge 400. The URI in this SIP INVITE 412 contains a description of the target media (e.g., song title) and the IP address/port of the SIP interface 414. The description of the desired media may be complete or incomplete (e.g., a search string). The bridge 400 may use other techniques for forming the media descriptor, such as using a numeric identifier that is formed by a hash of a song title or a hash of the song's content. Alternatively, a standard URI may be used for all such requests (e.g., music-service@hostname), and the media descriptor data is embedded in the SIP message headers or SIP message body.

The bridge 400, upon receiving the INVITE 412, may need to query the media server 406 in order to determine the existence and location of the requested content. This may involve converting 416 some of the data included in the INVITE request 412 into a CDS Search request 418. Here, the Search request 418 is delivered from a Control Point interface 420 to a CDS 422 associated with the Media Server 406. In some arrangement, multiple CDS/Media Servers may be searched, and the results of those searches may need to be examined. Assuming a positive result 424 is received from the CDS 422, the bridge 400 can transform 426 data in the result to form a SIP ACK 428 which is sent back to the requesting terminal 404. Other SIP transactions (not shown) may occur between the invite 428 and ACK 428, such as TRYING and RINGING responses sent from the bridge 400 to the mobile terminal 404.

The SIP interface 414 of the bridge 400 can be configured to operate as a SIP User Agent, such that the SIP enabled mobile device 404 needs no special adaptations in order to connect to the bridge 400, except for the ability for form the proper requests to stream the music (or perform any other data transfer). In the SIP negotiations 412, 428, the bridge and mobile device 404 will also define the media parameters via SDP (or other methods known in the art). In this example, the bridge 400 includes and RTP/RTSP interface 430 that is capable of engaging in media sessions as negotiated between the bridge 400 and the mobile device 404. After the ACK 404 is received, the mobile device 404 establishes a media session 432 with the RTP/RTSP interface 430. In turn, a media renderer interface 434 of the bridge 400 establishes a streaming connection 436 with the media server 406, and data from this stream 436 is routed 438 to the outgoing stream 432. The routing 438 may involve simply sending the data unaltered, or may involve transcoding and similar transformations.

Figure 5:
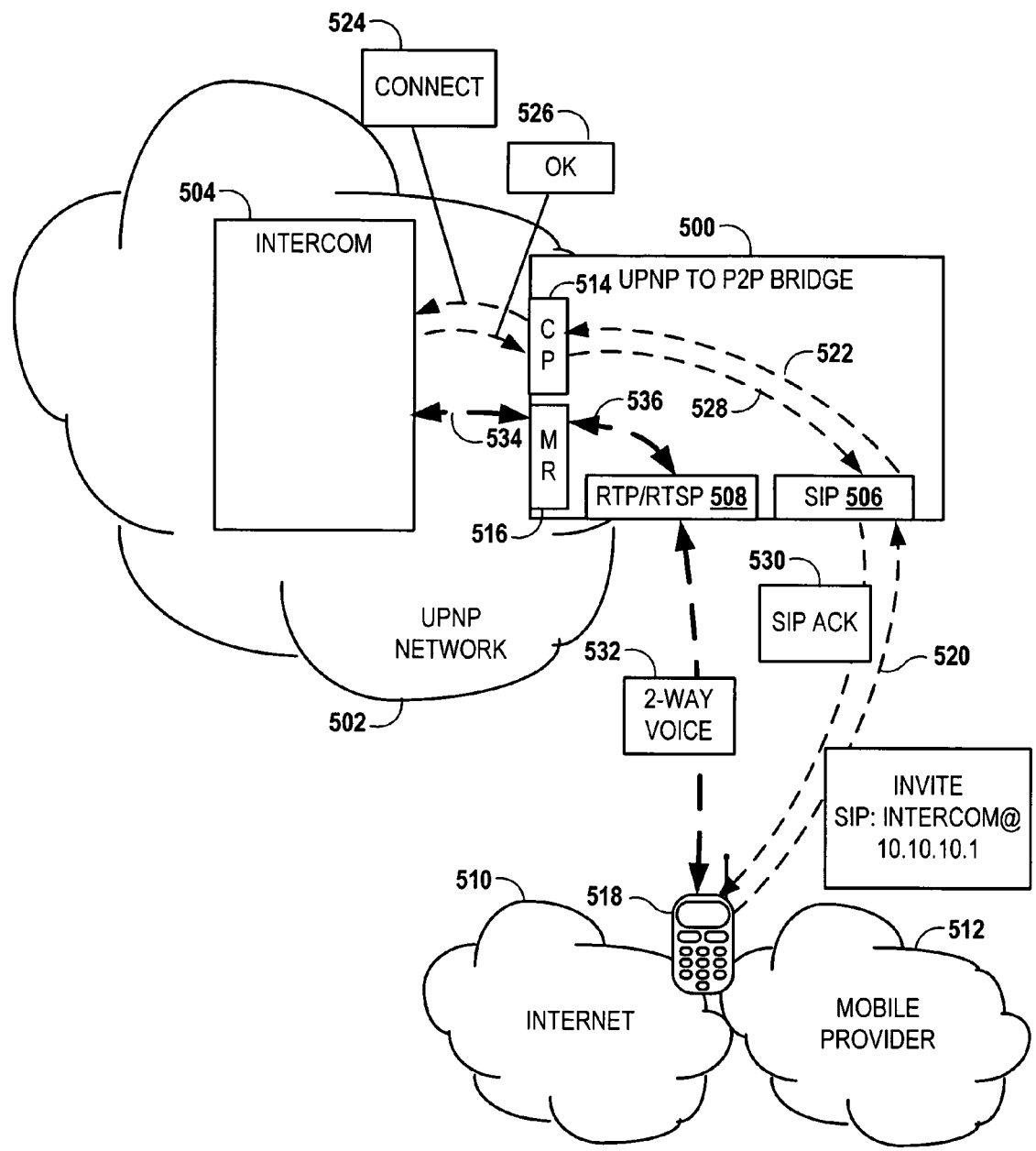
FIG. 5 is a block diagram illustrating streaming content between a UPnP network and Internet P2P devices according to embodiments of the invention.

A device such as bridge 400 may also facilitate more traditional SIP interactions, such as two way voice and video calls. FIG. 5 illustrates an example of voice call established with elements of a UPnP network 502 via a bridge device 500 according to an embodiment of the present invention. In this example, a UPnP intercom 504 is employed via a local network 502. The intercom 504 may be a dedicated collection of devices (e.g., speaker/microphone panels) or may use UPnP to provide intercom functionality by causing disparate UPnP capable devices (e.g., stereos, computers, speakerphones, mobile phones) to interact as an intercom system. The bridge 500 includes a SIP interface 506 and an RTP/RTSP interface 508 that operate with the Internet 510 and/or mobile provider networks 512 as described above. The bridge 500 also includes a Control Point interface 514 and a Media Renderer interface 516 for communicating with elements of the UPnP network 502.

A mobile device 518 is capable of SIP and RTP/RTSP communication via any combination of the Internet 510 and provider networks 512. The user of the device 518 initiates a voice call to the intercom 504 by sending a SIP invite 520 to the SIP interface 506 of the bridge 500. The bridge 500 converts 522 the INVITE 512 to a format suitable to request 524 a UPnP connection with the intercom 504. The UPnP request 524 is sent via the Control Point interface 514 of the bridge 500, and an affirmative response 526 is received by the Control Point interface 514. The response 526 is converted 528 to a SIP ACK 530. Upon receipt of the ACK 530, the mobile device 518 establishes two-way voice communications 532 with the RTP/RTSP interface 508 of the bridge 500. The bridge 500 also establishes a voice session 534 between the Media Renderer interface 516 and the intercom 504. The bridge 500 connects 536 these two sessions 532, 534, by at least passing/buffering data, and possibly performing transcoding and other operations.

Figure 6:
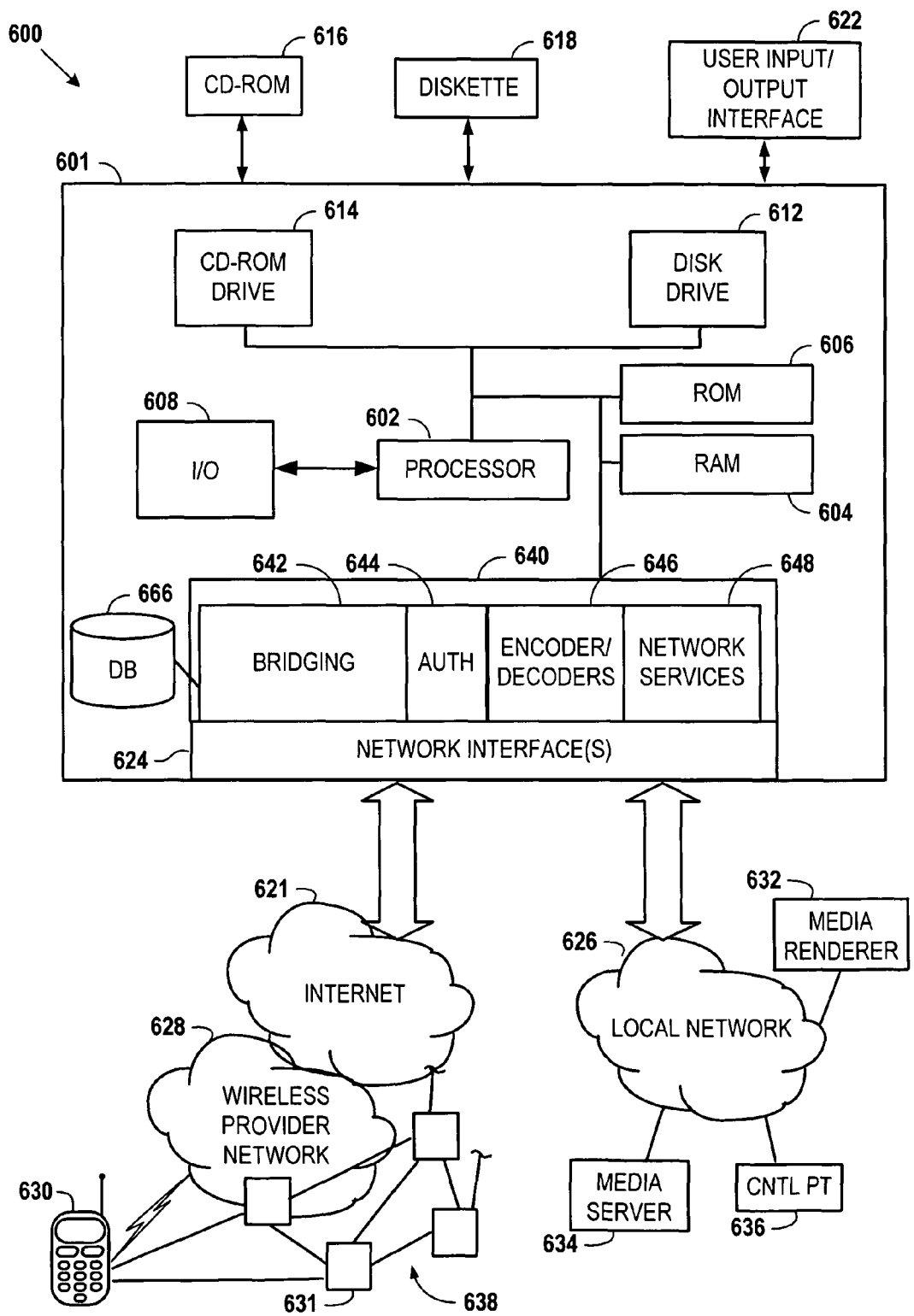
FIG. 6 is a block diagram illustrating a bridge device according to embodiments of the invention.

In the preceding figures, various examples were presented of use-case scenarios for a bridge device according to embodiments of the invention. Many types of apparatus may be able to act as a bridge, including conventional desktop a portable computers, set top boxes, digital media centers, portable communications devices, and other processing devices known in the art. In reference now to FIG. 6, a block diagram illustrates an example bridge 600 according to embodiments of the invention. The bridge 600 includes a computing arrangement 601. The computing arrangement 601 may include custom or general-purpose electronic components. The computing arrangement 601 includes a central processor (CPU) 602 that may be coupled to random access memory (RAM) 604 and/or read-only memory (ROM) 606. The ROM 606 may include various types of storage media, such as programmable ROM (PROM), erasable PROM (EPROM), etc. The processor 602 may communicate with other internal and external components through input/output (I/O) circuitry 608. The processor 602 carries out a variety of functions as is known in the art, as dictated by software and/or firmware instructions.

The computing arrangement 601 may include one or more data storage devices, including hard and floppy disk drives 612, CD-ROM drives 614, and other hardware capable of reading and/or storing information such as DVD, etc. In one embodiment, software for carrying out the operations in accordance with the present invention may be stored and distributed on a CD-ROM 616, diskette 618 or other form of media capable of portably storing information. These storage media may be inserted into, and read by, devices such as the CD-ROM drive 614, the disk drive 612, etc. The software may also be transmitted to computing arrangement 601 via data signals, such as being downloaded electronically via a network, such as the Internet 621. The computing arrangement 601 may be coupled to a user input/output interface 622 for user interaction. The user input/output interface 622 may include apparatus such as a mouse, keyboard, microphone, touch pad, touch screen, voice-recognition system, monitor, LED display, LCD display, etc.

The computing arrangement 601 may be coupled to other computing devices via networks. In particular, the computing arrangement includes a network interface 624 capable of interacting with respective local "home" networks 626 and external "public" networks 621, 628. The network interface 624 may include a combination of hardware and software components, including media access circuitry, drivers, programs, and protocol modules. Ultimately, the computing arrangement 601 may be configured to allow exchange control and media session data between devices 630, 631 of the external networks 621, 628 and devices 632, 634, 636 of the local network 626. In particular, the external networks include the Internet 621 and a wireless provider network 628 that provides digital data services to mobile users. An infrastructure-based P2P network 638 may reside on one or both external network 621, 628. Additionally, the local network 626 may include an ad-hoc P2P network that enables communications between diverse consumer electronics devices, as exemplified by the UPnP media renderer 632, media server 634, and control point 636.

The computing arrangement 601 includes processor executable instructions 640 for carrying out tasks of the computing arrangement 601. These instructions 640 may include a bridging module 642 that handles the bridging functionality of the computing arrangement 601. As will be described in greater detail hereinbelow, the bridging module 642 handles both control and data transfer aspects of bridging operations. The control aspects of the bridging operation may include data query/response, connection requests, status query/response, and translating these responses between networks 621, 628, 626. The data transfer aspects may include operations related to file transfer, streaming data, and transforming/transcoding data.

The bridging module 642 may interact with other modules that assist in one or more functions associated with bridging. For example, a security module 644 may handle user authentication, data encryption, security of the network interface, and other aspects needed to safely connect to the untrusted networks 621, 628. An encoder/decoder module 646 may include a codecs library for processing media streams. The bridging module 642 may use codecs from the encoder/decoder module 646 for transforming data files and data streams processed via the bridge 600. Finally, a network services module 648 may provide common network services for the bridging module 642, such as accessing domain name resolution services, location services, time services, etc.

Figure 7:
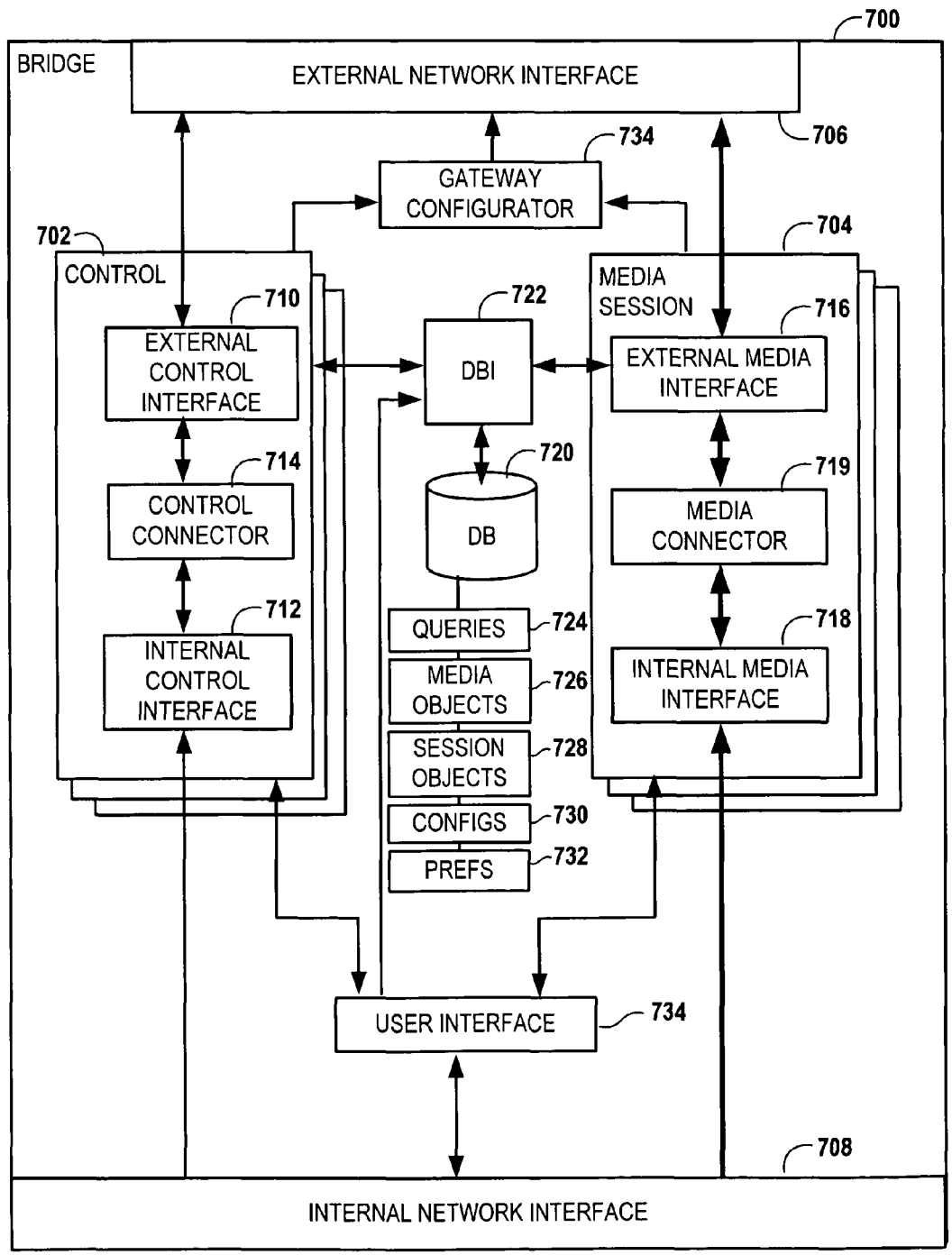
FIG. 7 is a block diagram illustrating components of bridge software according to embodiments of the invention.

In reference now to FIG. 7, a block diagram illustrates a more detailed view of a bridging module 700 according to embodiments of the invention. The bridging module 700 may be configured as a single or multi-threaded process, and may involve multiple processes executing on the same or different processors. The primary functions of the module 700 are divided into two general categories, control and media transfer, as exemplified by respective control and media session components 702, 704. Both the control and media session components 702, 704 manage communications between an external network interface 706 and an internal network interface 708, which are coupled to respective external and internal networks (not shown). The network interfaces 706, 708 typically include the software and protocol stacks needed to communicate via respective networks. The network interfaces 706, 708 may share the same hardware, drivers, and underlying network functional layers (e.g., data link, network, transport, session, presentations) but may include different configurations and separate application-level functionality. For example, the external network interface 706 will likely have security measures such as strict restrictions on accepting connections and stateful packet inspection, etc.

The control module 702 handles control signals and metadata involved with discovering and using services via internal and external network interfaces 706, 708, and the media session module 704 handles the actual data transfer of individual, block, files, or streams of data. Although the bridging module 700 may use a single instantiation each of control and media session components 702, 704, it is more likely that a plurality of each module may be instantiated, either statically or dynamically. For example, a fixed number of control components 702 may instantiated for known combinations of control scenarios (e.g., sharing of UPnP media to a Gnutella network, two way streaming of UPnP audio device to Internet SIP phone). In such a case, each instantiation of the control component 702 would handle all of the communications of that type.

In other arrangements, specially adapted components 702, 704 could be generated at run-time for each situation encountered. For example, a general purpose listener on the external network interface 706 could detect an incoming SIP message requesting a session for streaming a song located on a UPnP media player. The listener application could instantiate a control component 702 that handles SIP communications via the external network interface 706 and handles CDS communications via the internal interface 708. The media session components 704 could be similarly dynamically created, either by the listener program, or by the control component 702. Generally, the control component 702 will be involved in negotiating session parameters, and the composition of the media session component 704 may not be known until the negotiation is complete.

The control component 702 is generally involved in handling data transactions that are peripheral to the actual transfer of media and other data. The control component may 702 may include external and internal control interfaces 710, 712. These interfaces 710, 712 may be generically defined and instantiated as specific interfaces (e.g., SIP, CDS, P2P Query/

Session management) depending on system and session requirements. The specific instantiations of the interfaces 710, 712 may be pre-configured with the system setup and/or instantiated at runtime based on needs. A connector component 714 handles translation of data and states between the interfaces 710, 712.

The media session component 704 is generally involved in handling the data transfers that are enabled by use of the bridge 700. The media session component 704 may include external and internal session interfaces 716, 718. These interfaces 716, 718 may be instantiated as specific interfaces (e.g., HTTP, RTP/RTSP, and FTP) depending on system and session requirements. The specific instantiations of the interfaces 716, 718 may be pre-configured with the system setup and/or instantiated at runtime based on needs. A connector component 719 handles translation of data and states between the interfaces 716, 718.

The control and media session components 702, 704 may access a database 720 via a database interface 722. Generally, both components 702, 704 may need to store and read data structures for purposes of handling individual transactions, instantiating data objects, managing preferences, etc. The database 722 may store query data 724 that tracks data related to past and current queries. For example, the query data 724 may include temporary URIs mapped to the external interface 706 that correspond to a location accessible via the internal interface 708. These temporary URIs and other identifiers may also be associated with media objects 726 that represent individual files or streams of data. The media objects 726 may also contain other metadata such as type of encoding, bitrates, file sizes, etc.

The media session component 704 or other software may track individual sessions using session objects 728 stored in the database 720. The session objects 728 may contain such data as identity of network endpoints, protocols used, session history, etc. Another type of data stored in the database 720 is configurations 730 and preferences 732. Configurations 730 may be applied by users or other software. For example, IP addresses of the network interfaces 706, 708 may be automatically configured by the Dynamic Host Configuration Protocol (DHCP), which occurs at system start up. Alternatively, a user may apply a static IP address via a user interface component 734. The user interface component 734 provides a way for users to directly or indirectly control and view status of the bridge software 700.

The bridge 700 may also need to configure other components. In particular, where the bridge 700 is operating behind a firewall, gateway, and/or Network Address Translator (NAT), the bridge 700 may need to configure the NAT/firewall/gateway to accept incoming connection. This configuration of a NAT/firewall/gateway can be accomplished by a component such as a gateway configurator 734. The configurator 734 may include the ability to configure a gateway using, for example, a UPnP control point interface to access an IGD. These configurations can be applied for initial setup, and changed dynamically as needed. For example, the bridge may temporarily set an IGD to allow incoming connections on a particular port for a single session, and thereafter disable connections on the port.

Figure 8A:
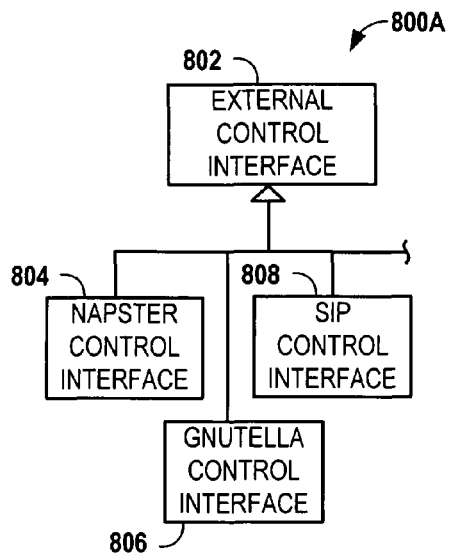
FIGS. 8A-D are block diagrams illustrating inheritance relationships between bridge interface components according to embodiments of the invention.
Figure 8B:
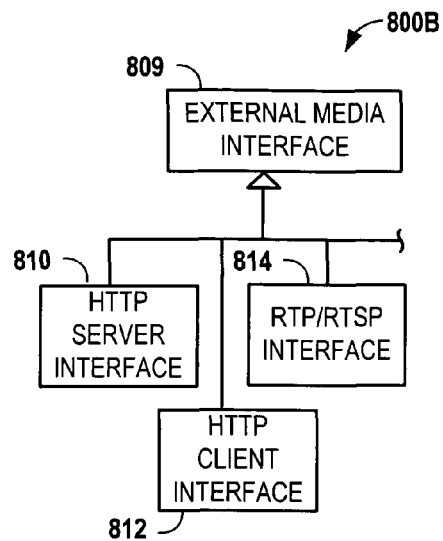

The control and media session components 702, 704 may have interfaces 710, 712, 716, 718 that are generically defined, and adaptable for use with a wide variety of bridging services. In reference now to FIGS. 8A-D, block diagrams 800A-D illustrate various specific instantiations of the various generic interfaces. In diagram 800A of FIG. 8A, a generic external control interface 802 may be instantiated as, among other things, a Napster control interface 804, a Gnutella control interface 806, and a SIP control interface 808. These specific interfaces 804, 806, 808 handle the actions needed to connect and exchange control signals according to the respective protocols of each interface 804, 806, and 808. In diagram 800B of FIG. 8B, a generic external media interface 809 may be instantiated as, among other things, an HTTP server interface 810, an HTTP client interface 812, and an RTP/RTSP interface 814. These specific interfaces 810, 812, 814 handle the actions needed to exchange media and other data according to the respective protocols of each interface 810, 812, and 814. Some of the interfaces, such as the HTTP client interface 812, may be for receiving data only, and others, such as the HTTP server interface 810, for sending data. Others, such as the RTP/RTSP interface 814, may be used for both sending and receiving data over the external network.

Figure 8C:
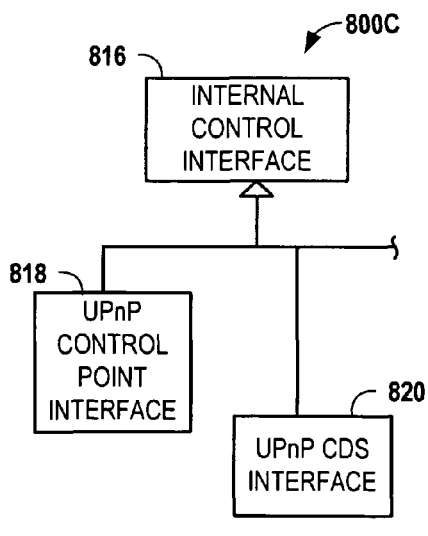
Figure 8D:
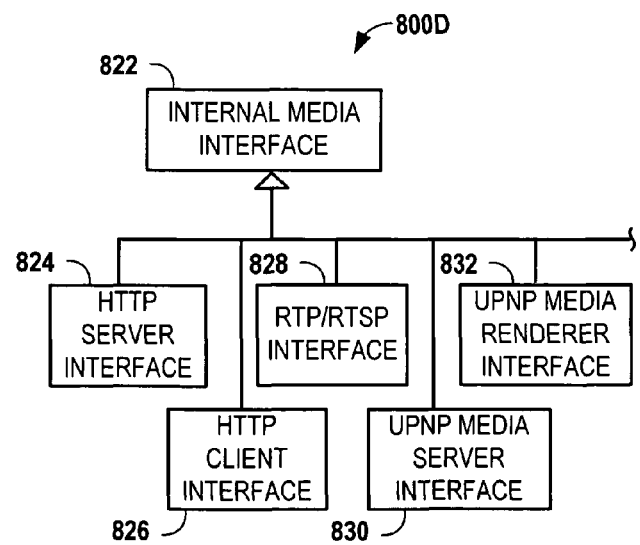

In diagram 800C of FIG. 8C, a generic internal control interface 816 may be instantiated as, among other things, a UPnP Control Point interface 818 and a UPnP CDS interface 820. These specific interfaces 818, 820 handle the actions needed to connect and exchange control signals according to the respective protocols of the internal network, which are UPnP control functions in this example. In diagram 800D of FIG. 8D, a generic internal control interface 822 may be instantiated as, among other things, an HTTP server interface 824, an HTTP client interface 826, an RTP/RTSP interface 828, a UPnP Media Server interface 830, and a UPnP Media Renderer interface 832. These specific interfaces 824, 826, 828, 830, and 832 handle the actions needed to exchange media and other data according to the respective protocols of each interface 824, 826, 828, 830, and 832. As with the media interfaces of FIG. 8B, these specific interfaces 824, 826, 828, 830, and 832 may act as one-way or two-way data transfer interfaces.

Figure 9:
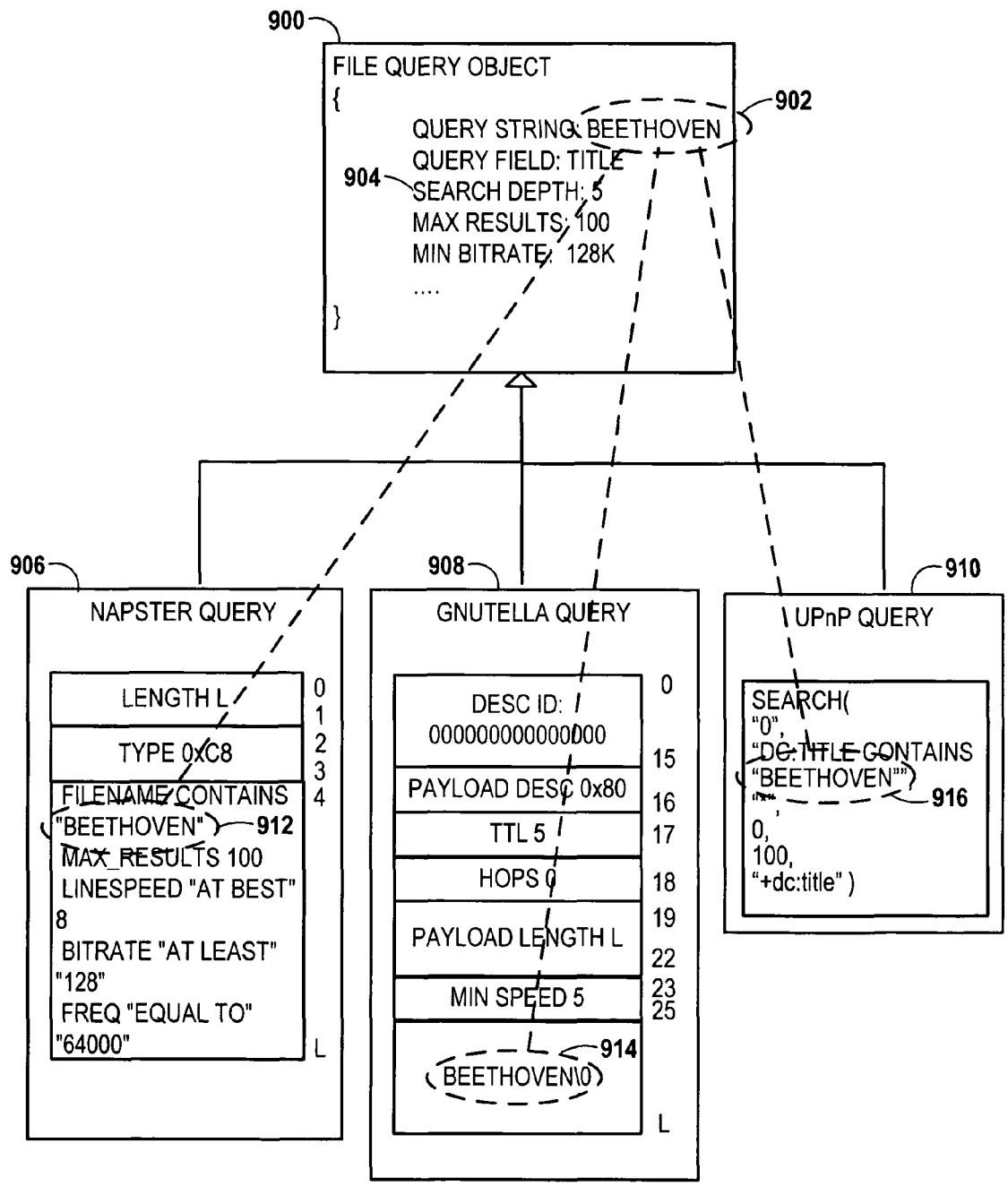
FIG. 9 is a block diagram illustrating inheritance relationships between bridge data structures according to embodiments of the invention.

The generic interfaces of FIGS. 8A-D may define behaviors that are generally applicable to most of the specific functions. For example, the control interfaces 802, 816 may define common, generic actions such as CONNECT, DISCONNECT, LISTEN, QUERY, QUERY_RESULT, etc. When the specific interfaces are formed, these generic actions are instantiated using the specific data and events required by the instantiated interface protocols. Similarly, the generic interfaces may incorporate generic data structures that may be transformed into specific structures required by the end protocols. An example of a generic data structure 900 according to embodiments of the invention is shown in FIG. 9. The illustrated generic structure 900 is for creating file queries. As such the file query object 900 contains data that may be common to almost all queries, such as a query string 902. Other data, such as search depth 904 (which may be equivalent to hops on a Gnutella-like network), may not be applicable to all queries, such as those directed to a single, known, repository or server.

An advantage of using a generic data structure 900 is that specific structures may be instantiated from the generic structure 900, thus providing a way of transforming between different structures. For example, a Napster query 906, a Gnutella query 908, and a UPnP CDS query 910 all inherit from the file query object 900. As can be seen, each of the specific instances 906, 908, 910 include respective search strings 912, 914, 916 that are the same as the search string 902. The specific instances 906, 908, 910 may make changes to some of the generic data, such as the addition of a null character to the end of the Gnutella search string 914.

Figure 10:
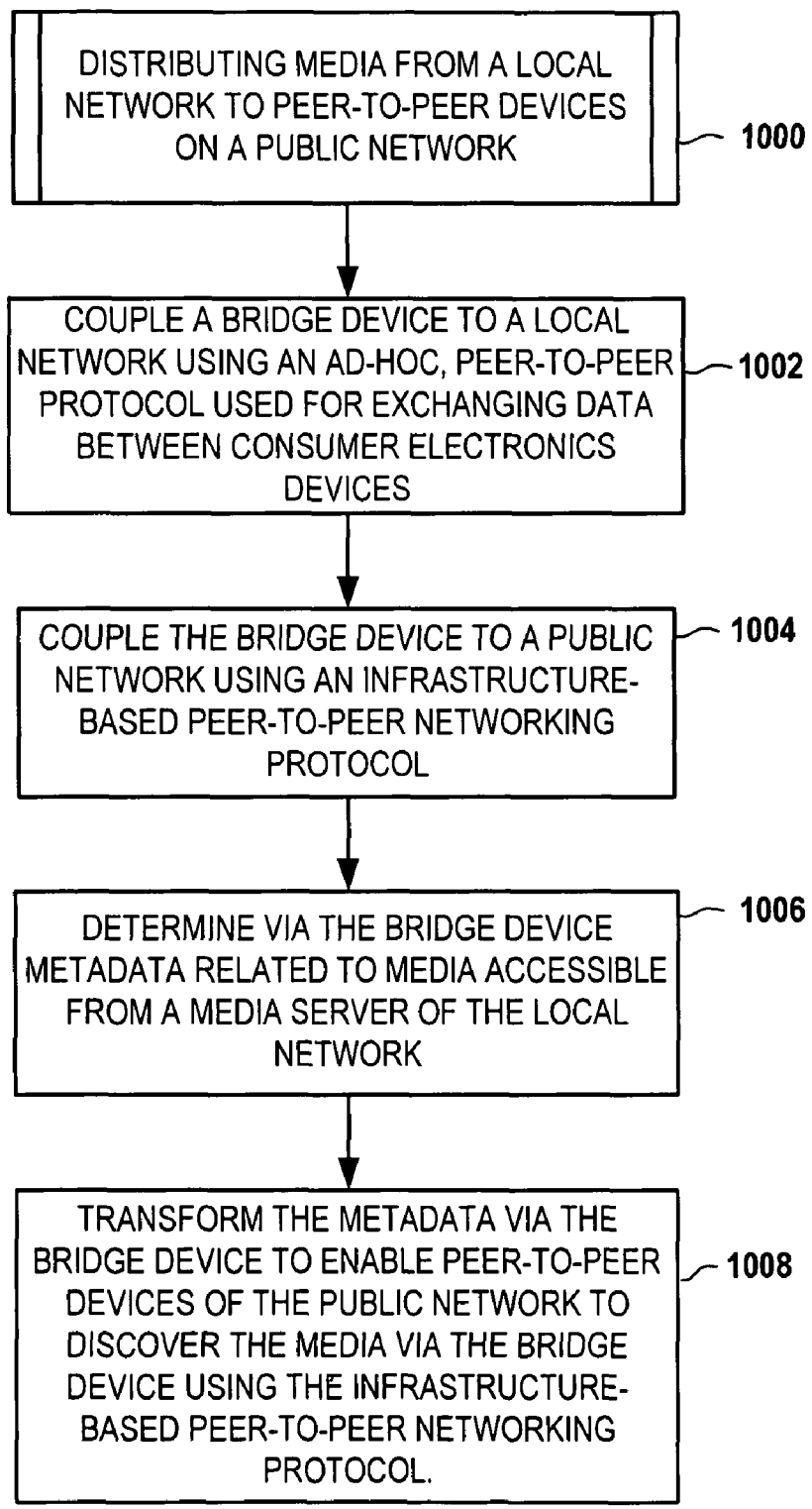
FIG. 10 is a flowchart illustrating a process for distributing media from a local network to peer-to-peer devices on a public network according to an embodiment of the invention.

In reference now to FIG. 10, a flowchart illustrates a procedure 1000 for distributing media from a local network to peer-to-peer devices on a public network. A bridge device is coupled 1002 to a local network using an ad-hoc, peer-to-peer protocol used for exchanging data between consumer electronics devices. The bridging device is coupled 1004 to a public network using an infrastructure-based peer-to-peer networking protocol. The bridge device determines or includes 1006 metadata related to media accessible from one or more media servers of the local network. The metadata is transformed 1008 via the bridge device to enable a device of the local network to discover the media via the bridge device using the ad-hoc, peer-to-peer protocol. The metadata is via the bridge device to enable peer-to-peer devices of the public network to discover the media via the bridge device using the infrastructure-based peer-to-peer networking protocol.

Figure 11:
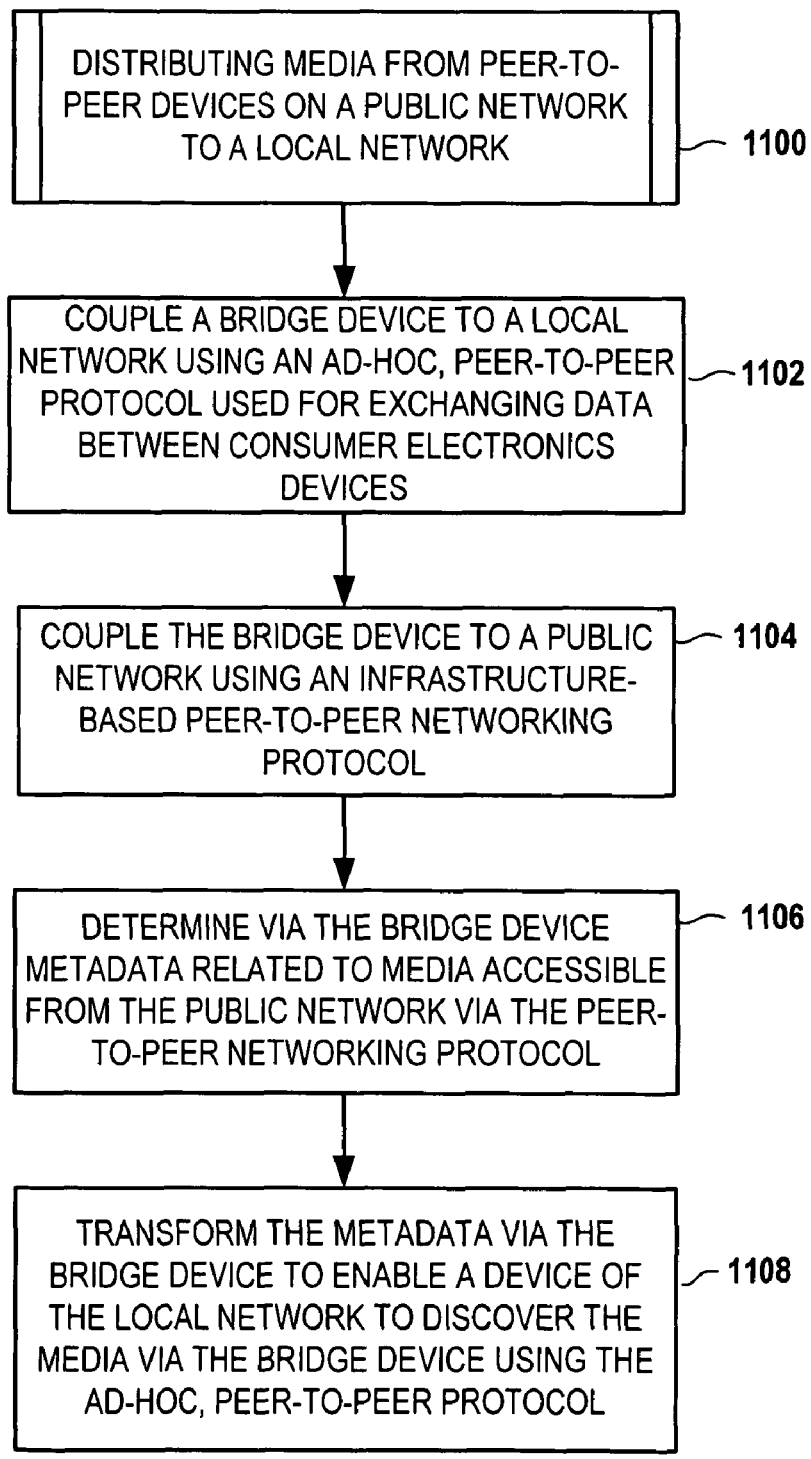
FIG. 11 is a flowchart illustrating a process for distributing media from peer-to-peer devices on a public network to a local network according to an embodiment of the invention.

In reference now to FIG. 11, a flowchart illustrates a procedure 1100 for distributing media from peer-to-peer devices on a public network to a local network. A bridge device is coupled 1102 to a local network using an ad-hoc, peer-to-peer protocol used for exchanging data between consumer electronics devices. The bridging device is coupled 1104 to a public network using an infrastructure-based peer-to-peer networking protocol. The bridge device determines or includes 1106 metadata related to media accessible from the public network via the peer-to-peer networking protocol. The metadata is transformed 1108 via the bridge device to enable a device of the local network to discover the media via the bridge device using the ad-hoc, peer-to-peer protocol.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method, comprising:
    coupling a bridge device to a local network using an ad-hoc, peer-to-peer protocol used for exchanging data between consumer electronics devices; coupling the bridge device to a public network using an Internet-based peer-to-peer networking protocol;
    causing, at least in part, reception at the bridge device of at least one query for media content that is stored in the local network and accessible from a media server of the local network, said query being in the Internet-based peer-to-peer networking protocol;
    transforming the query via the bridge device by at least translating the query into the ad-hoc, peer-to-peer protocol thereby enabling peer-to-peer devices of the public network to search for the media content via the bridge device using the Internet-based peer-to-peer networking protocol;
    causing, at least in part, transmission of the transformed query from the bridge device to the local network;
    forming, by the bridge device, a temporary filename for each hit of the query for media content;
    caching local network access data related with each temporary filename at the bridge device;
    causing, at least in part, presenting of the temporary filename at the peer-to-peer devices in the public network;
    facilitating downloading of the media content as a file to the peer-to-peer devices of the public network via the bridge device; and
    facilitating streaming of the media content to the peer-to-peer devices of the public network via the bridge device by establishing a Session Initiation Protocol session between the bridge device and at least one of the peer to peer devices of the public network.

2. The method of claim 1, wherein the transforming of the query involves extracting a title of media content or an identifier of the title from the query, making an internal record of the extracted data for later processing, and applying at least one change to the query data, wherein the identifier of the title is formed by hashing the title of the media content.

3. The method of claim 2, wherein the change includes at least one of encryption and decryption.

4. The method of claim 1, wherein coupling the bridge device to the local network using the ad-hoc, peer-to-peer protocol comprises coupling the bridge device to the local network using Universal Plug and Play.

5. The method of claim 4, wherein coupling the bridge device to the local network using Universal Plug and Play comprises coupling the bridge device to act as a Universal Plug and Play control point.

6. The method of claim 4, wherein coupling the bridge device to the public network using the Internet-based peer-to-peer networking protocol comprises coupling the bridge device to a Gnutella network.

7. The method of claim 4, wherein coupling the bridge device to the public network using the Internet-based peer-to-peer networking protocol comprises coupling the bridge device to a SIP-based communications network.

8. The method of claim 1, wherein the query in the Internet-based peer-to-peer networking protocol is translated into an UPnP Content Directory Service (CDS) query, and the transformed query is either transferred from the bridge device to a CDS in the local network, or processed within the bridge that includes a CDS database and caches listings from media servers of the local network.

9. An apparatus, comprising:
    at least one processor; and
    at least one memory including computer program code,
    the at least one memory and the computer program code configured to, with the at least one processor, cause the apparatus to perform at least the following,
        connect to a local network using an ad-hoc, peer-to-peer protocol used for exchanging data between consumer electronics devices;
        connect to a public network using an Internet-based peer-to-peer networking protocol;
        cause, at least in part, reception of at least one query for media content that is stored in the local network and accessible from a media server of the local network, said query being in the Internet-based peer-to-peer networking protocol;
        transform the query by at least translating the query into the ad-hoc, peer-to-peer protocol thereby enabling peer-to-peer devices of the public network to search for the media content via the apparatus using the Internet-based peer-to-peer networking protocol; and
        cause, at least in part, transmission of the transformed query to the local network;
        form a temporary filename for each hit of the query for media content;
        cache local network access data related with each temporary filename;
        causing, at least in part, presenting of the temporary filename at the peer-to-peer devices in the public network;
        facilitate downloading of the media content as a file from the local network to the peer-to-peer devices of the public network via one or more network interfaces; and facilitate streaming of the media content to the peer-to-peer devices of the public network via the one or more network interfaces.

10. The apparatus of claim 9, wherein the apparatus transfers the query by extracting a title of media content or an identifier of the title from the query, making an internal record of the extracted data for later processing, and applying at least one change to the query data, wherein the identifier of the title is formed by hashing the title of the media content.

11. The apparatus of claim 10, wherein the change includes at least one of encryption and decryption.

12. The apparatus of claim 9, wherein the apparatus is further caused to connect to the local network using Universal Plug and Play, and to act as a Universal Plug and Play control point.

13. The apparatus of claim 12, wherein the Internet-based peer-to-peer networking protocol comprises at least one of a Gnutella-based protocol and a SIP-based communications protocol.

14. The apparatus of claim 9, wherein the query in the Internet-based peer-to-peer networking protocol is translated into an UPnP Content Directory Service (CDS) query, and the transformed query is either transferred from the bridge device to a CDS in the local network, or processed within the bridge that includes a CDS database and caches listings from media servers of the local network.

15. A non-transitory computer-readable storage medium carrying one or more sequences of one or more instructions which, when executed by one or more processors, cause an apparatus to at least perform the following steps:

coupling to a local network using an ad-hoc, peer-to-peer protocol used for exchanging data between consumer electronics devices;

coupling to a public network using an Internet-based peer-to-peer networking protocol;

causing, at least in part, reception of at least one query for media content that is stored in the local network and accessible from a media server of the local network, said query being in the Internet-based peer-to-peer networking protocol;

transforming the query by at least translating the query into the ad-hoc, peer-to-peer protocol thereby enabling peer-to-peer devices of the public network to search for the media content via the apparatus using the Internet-based peer-to-peer networking protocol; and causing, at least in part, transmission of the transformed query to the local network; and forming by a bridge device a temporary filename for each hit of the query for media content;

caching local network access data related with each temporary filename at the bridge device;

causing, at least in part, presenting of the temporary filename at the peer-to-peer devices in the public network;

facilitating downloading of the media content as a file to the peer-to-peer devices of the public network via the bridge device; and facilitating streaming of the media content to the peer-to-peer devices of the public network via the bridge device by establishing a Session Initiation Protocol session between the bridge device and at least one of the peer to peer devices of the public network.

* * * * *